United States Patent [19]
Anderegg

[11] 3,849,042
[45] Nov. 19, 1974

[54] INJECTION MOLDING MACHINE FOR PRODUCING SLIDE FASTENERS

[76] Inventor: Hans Anderegg, 3, Hetterstrasse, Weiningen, Zurich, Switzerland

[22] Filed: Nov. 16, 1972

[21] Appl. No.: 307,188

[52] U.S. Cl............. 425/126 R, 425/129, 425/122, 425/814
[51] Int. Cl............................................... B29f 1/10
[58] Field of Search ........... 425/126, 122, 129, 123, 425/814; 226/158, 161, 147, 148, 156

[56] References Cited
UNITED STATES PATENTS

| | | | |
|---|---|---|---|
| 2,686,338 | 8/1954 | Morin | 425/122 |
| 2,695,419 | 11/1954 | Morin | 425/122 X |
| 2,721,649 | 10/1955 | Powers | 226/147 X |
| 2,947,537 | 8/1960 | Littell et al. | 226/156 |
| 3,097,395 | 7/1963 | Yoshida | 425/122 X |
| 3,178,772 | 4/1965 | Morin | 425/122 X |

*Primary Examiner*—Andrew R. Juhasz
*Assistant Examiner*—David S. Safran

[57] ABSTRACT

Injection molding machine for producing slide fasteners, typically zippers, by molding of the closure elements at the support or carrier band in a two-part mold, comprising an injection unit and a band feed mechanism, the axis of the injection unit being arranged substantially transverse to the band feed direction. The band feed mechanism comprises a to-and-fro movable band clamping mechanism provided with clamping elements and arranged after the mold in the feed direction. The band clamping mechanism is synchronously controlled with regard to the opening and closing movement of the mold in such a manner that when the mold is in an open condition the clamping elements fixedly clamp the support band at the region of the mold, the clamping mechanism then being advanced in the feed direction up to the region of a fixed stop in order to draw the support band with the closure elements molded thereon out of the mold and a fresh length of band into the open mold. Thereafter upon arrival of the clamping mechanism against the stop, the clamping elements release the support band and then the clamping mechanism is again retracted back towards the mold and in its terminal position upon closing the mold the clamping elements again fixedly clamp the support band.

2 Claims, 15 Drawing Figures

INJECTION MOLDING MACHINE FOR PRODUCING SLIDE FASTENERS

BACKGROUND AND SUMMARY OF THE INVENTION

The present invention relates to a new and improved construction of injection molding machine for producing slide fasteners, typically zippers, by injection molding the closure elements at a support or carrier band in a two-part injection mold, comprising an injection unit and a band feed mechanism, the axis of the injection unit extending substantially transverse to the band feed direction.

The present invention is particularly concerned with the arrangement of the support band guide- and support band-feed mechanism which allows for a completely automatic and substantially continuous operation of the injection molding machine.

According to the invention, the band feed mechanism possesses a to-and-fro movable band clamping mechanism provided with clamping elements and arranged after the injection mold in the feed direction. The band clamping mechanism is synchronously controlled with respect to the opening and closing movement of the mold in such a manner that with the mold open the clamping elements fixedly clamp the support band at the region of the mold, the clamping mechanism is then advanced in the feed direction up to a fixed stop in order to forwardly pull the length of the support band with the thereon injection molded closure elements out of the mold and to pull a fresh length of band into the open mold. Upon arrival of the clamping mechanism against the aforementioned stop, the clamping elements release the support band and then the clamping mechanism is again retracted back towards the injection mold and the clamping elements in the terminal position of the clamping mechanism during closing of the mold again fixedly clamp the band.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
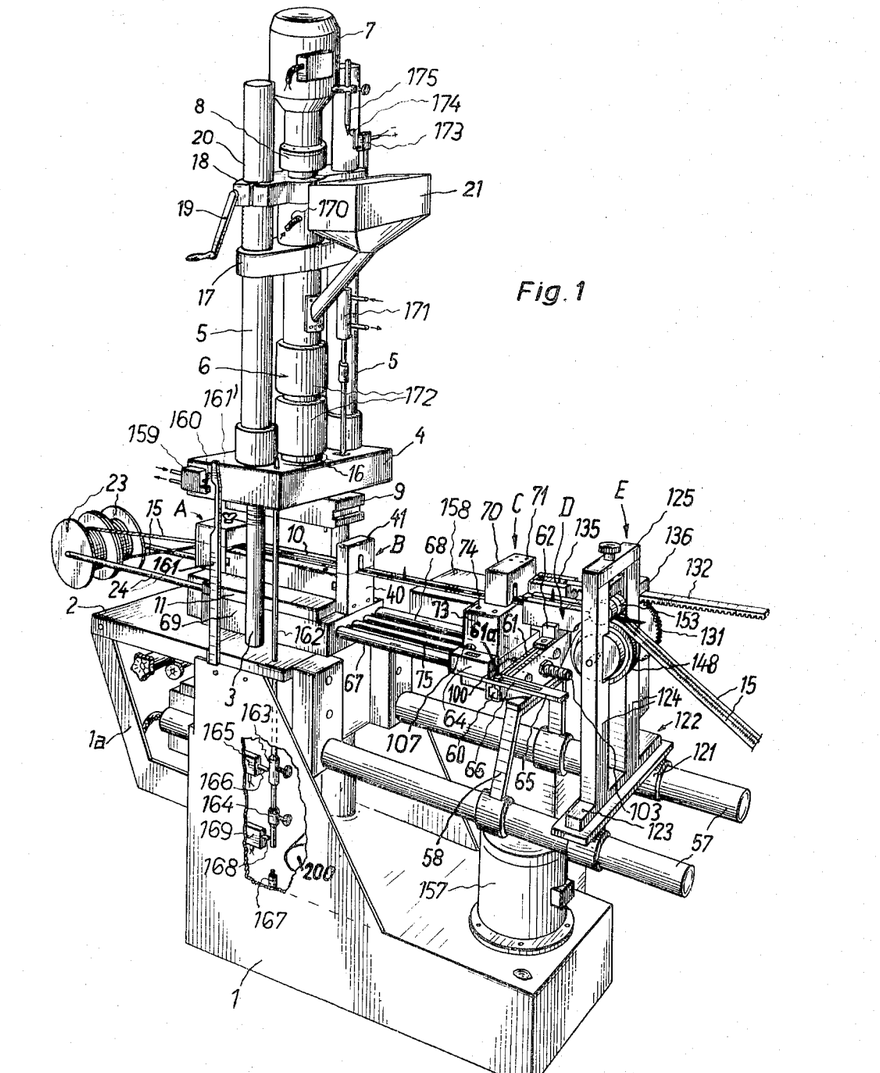
FIG. 1 is a perspective view of a preferred embodiment of injection molding machine for producing slide fasteners, especially zippers, and designed according to the teachings of the present invention.

Describing now the drawings, the exemplary embodiment of injection molding machine or equipment depicted in FIG. 1 will be understood to comprise a housing or frame 1, at the rear portion 1a of which there are arranged two non-visible hydraulic cylinders at the stationary machine plate 2. The piston rods 3 of such cylinders, of which only one is visible in the showing of FIG. 1, are upwardly extended with regard to the plate member 2 and carry an elevationally displaceable machine plate member 4. At the plate member 4 there are mounted two guide columns 5 for a conventional screw-type injection unit 6. Driving of its screw or worm occurs through the agency of a drive motor 7 located at the upper end of the injection unit 6 by means of a suitable transmission 8.

Injection molding of the slide fastener takes place in known manner in a two-part or bipartite mold 9, 10, wherein the upper movable mold half 9 (FIGS. 1 and 2) is secured to the movable machine plate member 4, whereas the lower fixed mold half 10 is carried by a plate member 11 secured to the machine frame or housing 1.

Figures 13, 14, 15:
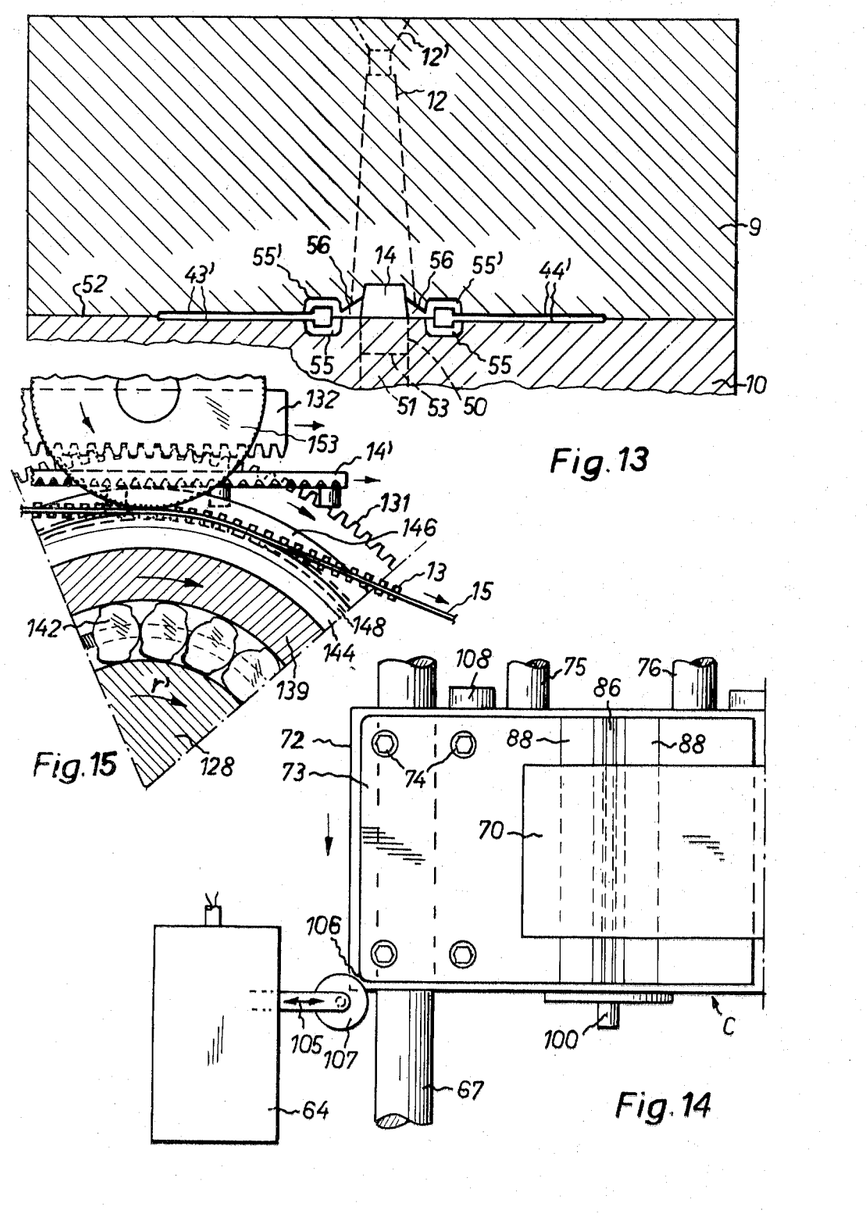
FIG. 13 is a cross-sectional view through both mold halves of the closed injection mold.
FIG. 14 is a plan view of a portion of the clamping mechanism.
FIG. 15 is a fragmentary portion of a cross-section through drive means including a return blocking device employed for the band feed.

Continuing, it is to be understood that at the upper mold half 9 there is located a conical-shaped sprue runner or channel 12 (FIGS. 2 and 13) for the plastic material which is plasticized at the screw injection unit 6. At the parting plane 52 of both mold halves 9 and 10, there are provided in known manner two rows of hollow mold cavities or compartments 55 at the lower mold half 10 and two rows of hollow mold cavities or compartments 55' at the upper mold half 9. Two such confronting hollow cavities 55, 55' collectively form a casting mold for an individual closure element 13 of the slide fastener, typically zipper (FIG. 4), which is to be produced. The conical-shaped sprue channel 12 at the upper mold half 9 opens into a central distributor channel 14 at such upper mold half, this central distributor channel 14 extending over the length of the mold 9, 10. Leading from both sides of the central distributor channel 14 are small transverse channels 56 which open into each individual hollow mold cavity 55, 55' for the corresponding closure element. Laterally of the hollow cavities or spaces 55, 55' for the closure element 13, there is provided at the lower and upper mold halves a respective flat recess 43' and 44' serving for receiving a support or carrier band 15 at the conventional peripheral or marginal bead 22 of which there are molded in the hollow cavities 55, 55' the closure elements 13. At the mold 9, 10 there are simultaneously molded two rows of closure elements 13 at two such support or carrier bands 15.

Cooperating with the sprue runner or channel 12 at the mold half 9 is a standard injection nozzle which has not been particularly shown, but which is located at the lower end of the screw or worm injection molding unit 6. When the mold 9, 10 is closed this injection nozzle is snugly pressed against the conical seat 12' of the channel 12 at the moment of injection of the material. The lower end of the injection molding unit 6 penetrates through an opening 16 provided at the movable plate member 4. The injection unit 6 is vertically movable with regard to the plate member 4 in order to be able to forwardly advance the injection nozzle out of the plate member 4 for the purpose of inspection and cleaning. To this end, there are elevationally guided at a pair of guide columns 5 two interconnected yokes 17 and 18. Now at yoke 18 there is rotatably mounted a crank arm 19, at the shaft of which there is seated a non-visible pinion which meshes with a tooth arrangement or rack 20 provided along the associated guide column 5. By rotating the crank 19 the injection molding unit 6 can be raised out of the position depicted in FIG. 1 relative to the movable machine plate member 4 until there protrudes out of the plate member 4 the injection nozzle located at the lower end of the injection screw or worm. After the necessary cleaning or exchange of the injection nozzle, the injection molding unit 6 is again lowered back into its normal position of use by means of the crank 19, at which position the injection nozzle bears against the conical seat 12' of the upper mold half 9.

A filling funnel or receptacle 21 for receiving the plastic to be injected is mounted at the injection molding unit 6. The injection molding device described up to now of the illustrated embodiment of injection molding machine is known in the art and does not constitute subject matter of the invention, having merely been discussed to provide a better understanding of the overall equipment.

As already mentioned, injection molding of the slide fastener with the described injection apparatus occurs at the two-part mold 9, 10, and specifically there are simultaneously and continuously applied a respective row of closure elements 13 at the peripheral or marginal bead 22 (FIG. 4) of each of the two support bands 15 which are disposed adjacent one another at the injection mold. These support or carrier bands 15 are wound, at the rear end of the machine, upon rotatable supply rolls 23 carried by rods 24 secured to the plate member 11, as best seen by referring to FIG. 1.

To render possible the continuous automatic fabrication of slide fasteners or closures at the two-part or bipartite mold 9 and 10, there are advantageously provided the hereinafter described band guide- and band-feed mechanisms.

Figure 5:
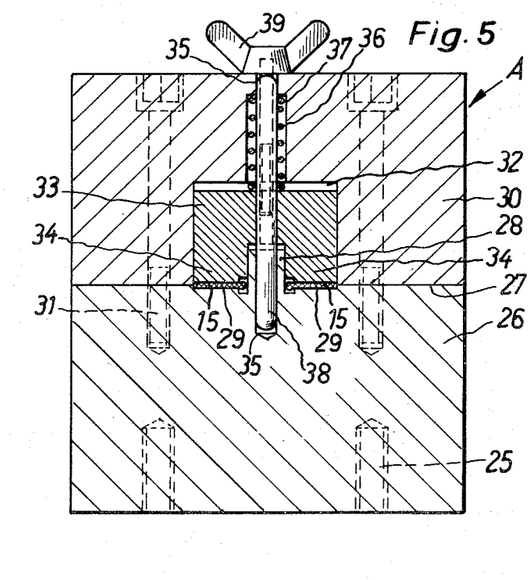
FIG. 5 is a vertical sectional view through the band guide portion of the equipment, taken substantially along the line V—V of FIG. 2.
Figure 6:
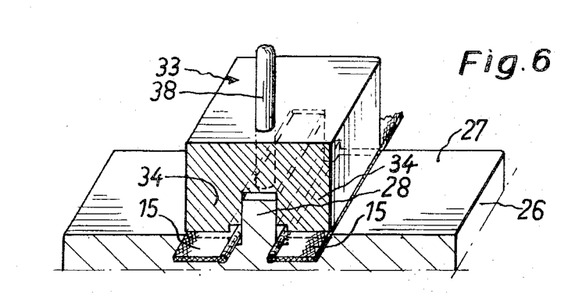
FIG. 6 is a perspective view of a detail of the construction of FIG. 5.

Now for the purpose of drawing-in both support or carrier bands 15 into the injection mold 9, 10 the bands are initially drawn through a band brake mechanism A which is assigned the function of continuously maintaining in a taut or stretched condition the support bands drawn into the mold. This brake mechanism A has been depicted in greater detail in FIGS. 2, 5 and 6. A prismatic block 26 is secured by means of screws 25 or equivalent fastening devices to the fixed mold support plate member 11. A central ledge or projection 28 which extends in the direction of band feed protrudes past the upper surface 27 of the prismatic block 26. At both sides of the ledge 28 there are provided at the surface 27 two flat recesses 29 for receiving the support or carrier bands 15, these flat recesses 29 extending essentially parallel to the ledge 28. A second prismatic block 30 is mounted at the surface 27 of the block 26, block 30 being secured to block 26 by means of screws 31 or equivalent structure. In the block 30 there is formed, as by machining, a downwardly open trough or recess 32 of substantially rectangular-shaped cross-section, this trough 32 extending in the band feed direction over the entire length of such block. Now in this trough 32 there is loosely inserted a clamping bracket 33 possessing in cross-section a substantially U-shaped configuration, bracket 33 stradling the ledge 28 by means of both of its legs 34. The height of the bracket 33 is somewhat less than the depth or height of the trough 32, so that the bracket 33 can be moved up and down i.e. elevationally within trough 32.

Now four vertical bores 35 are provided at the block 30, these bores 35 extending up to the region of the trough or recess 32. Within the block 30 the bores 35 are widened for receiving a respective pressure spring 36, the lower end of which is supported at the bracket 33 and the upper end of which bears against shoulder 37 of block 30. The bores 35 also extend through the bracket 33 and through the ledge 28 into the body of the block 26. At the lower region of each bore 35 there is fixedly inserted a guide pin 38 which extends through the bracket 33 up to the upper end of the bore 35 at the block 30. Pin 38 serves for guiding the clamping bracket 33 which it will be recalled is movable in the trough or recess 32 of the block 30. This clamping bracket 33 can be lightly pressed against both support or carrier bands 15 under the action of the four springs 36. In this way and prior to movement of the support or carrier bands 15 into the injection mold 9, 10, there can be exerted a braking force upon the bands, so that before drawing these support bands into the mold 9, 10 and for the further feed movement of such support bands a certain tensional force is exerted upon such support bands and both bands are arranged in a taut or stretched condition in the injection mold 9, 10 when the latter is closed. The intensity of the braking pressure acting upon the support bands 15 can be regulated by a wing nut or screw 39 which is guided through the center of the block 30 and threadably connected with the bracket 33. By threading-in and threading-out the wing nut 39, the head of which bears against the upper surface of the block 30 (FIG. 6), the bracket 33 can be raised or lowered in the trough 32 and the braking force exerted by this bracket upon the support bands 15 can be varied and accommodated to the prevailing thickness of the support bands.

Figures 2, 3, 4:
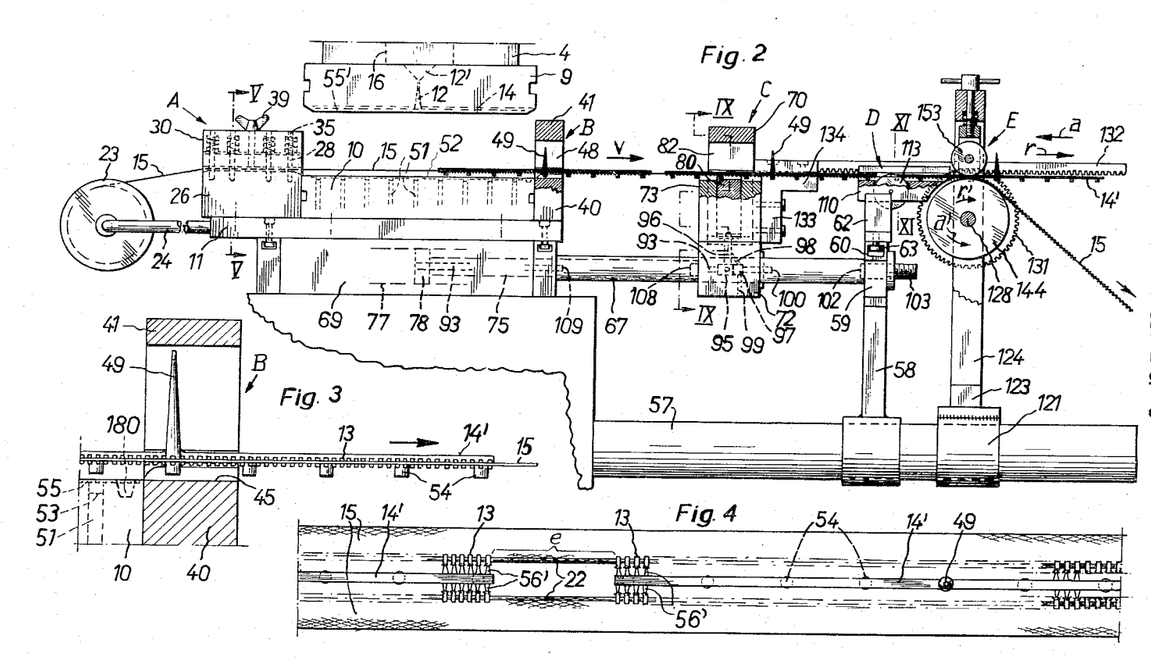
FIG. 2 is a side view, partially in longitudinal section, showing details of the guide- and feed-mechanisms for the support or carrier band at which there is injection molded the closure elements.
FIG. 3 is a detail view of a portion of FIG. 2 with a portion or partial piece of a molded slide fastener in a position in which it is drawn out of the open mold.
FIG. 4 is a plan view of two support bands with the closure elements molded thereon in a condition as such is drawn out of the injection mold.
Figure 7:
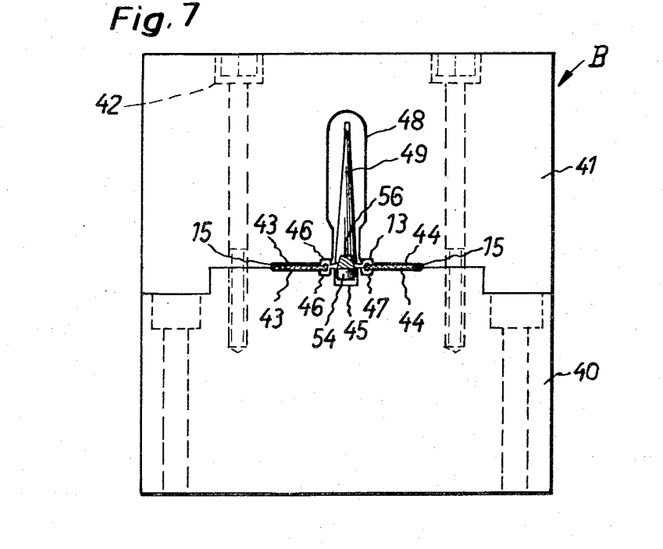
FIG. 7 is an end view of the band guide mechanism at the forward end of the mold with the therein located support bands and the closure elements injection molded thereon.
Figure 8:
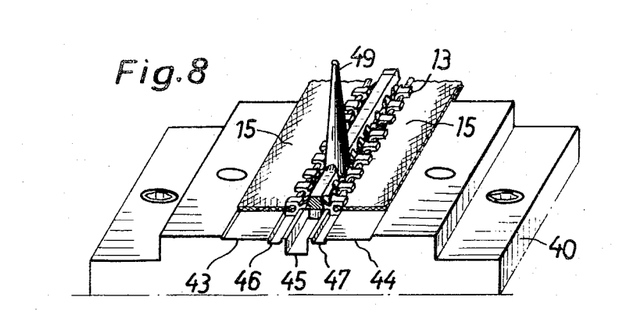
FIG. 8 is a perspective view of the lower portion of the guide with the thereon bearing injection molded part with the upper portion raised.

Now at the outlet or exit end of the fixed mold half 10, there is provided a further guide mechanism B for the support or carrier bands 15, as best recognized by referring to FIGS. 7 and 8. A block 40 is threadably connected with the mold support plate member 11, and at this block 40 there is secured by means of screws 42 or equivalent structure a second block 41. At the parting plane of both blocks, that is to say at the upper surface of the lower block 40 and at the lower surface of the upper block 41 there are formed two respective flat recesses 43 and 44 which collectively form a respective hollow space for the throughpassage of both support bands 15. At the lower block 40 there is provided between both recesses 43 and 44 a continuous central deeper trough 45. To both sides of this central trough 45 there is provided at the lower and at the upper blocks a respective continuous channel or trough 46 and 47. Above the central channel or trough 45 of the lower block 40 there is provided at the upper block 41 an elongate, continuous opening 48. The troughs 46 and 47 at both blocks 40 and 41 collectively form a hollow compartment through which slide the closure elements 13 injection molded at the mold 9, 10 when, following injection molding of a slide closure in the mold, the support bands 15 are drawn in the direction of the arrow v of FIG. 2 in order to draw a fresh length of support band into the mold. The opening 48 at the upper block 41 serves for the through-passage of a conical molded or sprue piece 49 which has solidified following the injection molding operation in the sprue runner or channel 12 of the upper mold half 9 (FIG. 2). Hereover, at the deeper trough 45 there slide the injection material plugs 54 formed during the injection molding operation at the opening 50 for the ejector pins 51 between the mold parting surface 52 and the end surface 53 of the retracted ejector arrangement (see also FIGS. 3 and 13), whereas the molded or sprue ledge 14' solidified at the distributor channel 14 slides through the lower portion of the opening 48.

The support band-feed mechanism mounted at the front end of the injection molding machine possesses a band clamping mechanism C, a cutting mechanism D for separating or cutting the sprue ledge 14' solidified in the distributor channel 14 of the casting mold after the injection molding operation from the closure element rows injection molded at the support bands, and a band return-blocking or stop mechanism E.

The machine frame 1 possesses two fixed support columns 57 at which there is secured for adjustment in lengthwise direction a support or carrier bracket 58. A carrier or support piece 59 is fixedly threadably connected at the bracket 58. This carrier piece or member 59 is provided at its upper region with a continuous opening 60 of square or quadratic cross-section, the upper wall of which is provided with an elongate slot 61. An angle piece 62 is adjustably secured to the carrier piece or member 59 in the transverse direction of the machine by means of a screw 63 guided in the slotted opening 60 and penetrating through the slot (FIG. 2).

The angle piece 62 serves for fixedly retaining the cutting mechanism D. A terminal switch-housing 64 (FIGS. 1 and 14) is mounted through the agency of a slotted plate or bar 65 at the support or carrier piece 59, and wherein the plate 65 is laterally displaceably secured at the carrier piece 59 by means of a screw 61a guided through the slot 61. By means of the elongate slot 66 of the slotted plate 65, it is possible to adjust the housing 64 in the lengthwise direction and to fixedly retain such in random desired position at the plate member by means of the screw 61a penetrating through the slot 66. The support bandclamping mechanism C is displaceably mounted upon two fixed support rods 67 and 68 (FIG. 1). Both of these rods 67 and 68 are secured at one end at the support piece or member 59 and at the other end are connected with a fixed housing 69 carried at the machine plate member 2.

Figures 9, 10, 11:
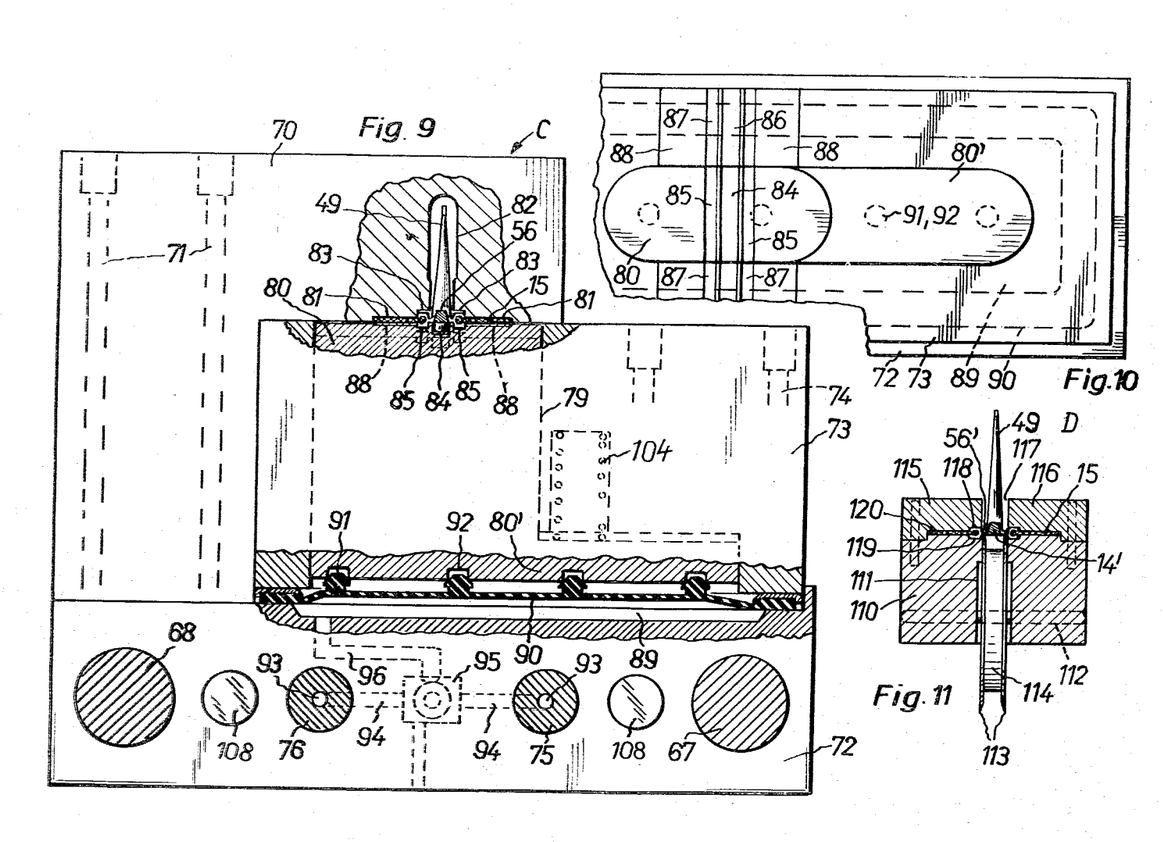
FIG. 9 is a sectional view of the machine taken substantially along the line IX—IX of FIG. 2 and shows the support band-clamping mechanism for the band feed.
FIG. 10 is a plan view of the movable clamping tongue or clamping portion of the clamping mechanism.
FIG. 11 is a vertical sectional view through the cutting mechanism for separating the pouring-in or sprue ledge or border from the rows of closure elements injection molded upon both of the support bands.

The clamping mechanism C as best seen by referring to FIGS. 9 and 10 possesses an upper, fixed clamping tong or gripper portion 70 which is secured to a lower guide portion 72 by means of four screws 71 or equivalent structure. Inserted between both components 70 and 72 is a central part or component 73 which is likewise connected by means of screws 74 or equivalent fastening expedients to the guide portion 72. This lower portion 72 is displaceably seated upon the support rods 67 and 68. Two piston rods 75 and 76 penetrate by means of their ends into the interior of the guide portion 72 and are fixedly anchored therewith. The other ends of these piston rods 75 and 76 penetrate into the housing 69 and each carry a piston member 78 which is movable to-and-fro in a pneumatic cylinder 77 (FIG. 2).

The central or intermediate portion 73 of the clamping mechanism possesses a hollow compartment 79 which is open towards the bottom and in vertical section possesses a substantially L-shaped configuration. Now into this hollow compartment 79 there is inserted a clamping element 80 forming a movable clamping portion, this clamping portion or element 80 having a form corresponding to the hollow compartment 79 and being inserted in the latter with vertical play. Both of the support or carrier bands 15 with the thereon cast molded parts are guided between the fixed clamping element or portion 70 and the movable clamping element or portion 80. For this purpose the fixed clamping element 70 is provided in the same manner as the guide block 41 of FIG. 7 with two flat recesses 81 for guiding both support bands 15, and with an elongate opening 82 located between these recesses and which serves for the throughpassage of the material cone 49 solidified at the sprue channel of the mold and the sprue ledge 14' solidified at the distributor channel 14 of the mold. For the throughpassage of the closure elements 13 injection molded at the bead 22 of the support bands 15 there are provided two recesses 83 which are located laterally of the opening 82.

Now, at the movable clamping element 80 there are provided a suitable continuous trough 84 for guiding the plug 54 of the injection molded part and to both sides of this trough 84 a respective recess 85 for the throughpassage of the closure elements 13. The trough 84 and the recesses 85 are respectively somewhat deeper than the height of the plug 54 and one-half of the thickness of the closure element. At the upper surface of the central fixed portion 73 of the clamping mechanism C there are continued at both sides of the movable clamping element 80 the guides for the injection molded part with the support bands. As best seen by referring to FIG. 10, there are provided at the upper surface of the part or portion 73 a central trough 86, to both sides of the central trough 86 a respective recess 87 and a respective recess 88. The trough 86 is located at the extension of the trough 84 of the clamping element 80 and the recesses 87 are located at the extension of the corresponding recesses 85 of the clamping element. No flat recesses for the support bands are provided at the clamping element 80. The recesses 88 at the fixed portion 73 of the clamping mechanism are located, however, at the extension of the recesses 81 at the fixed clamp element or portion 70.

At the upper face of the fixed clamping housing or guide portion 72 of the clamping mechanism, there is arranged an approximately rectangular, flat recess or compartment 89 opposite the downwardly open hollow compartment 79 for the clamping element 80 which is movable up and down in the portion 73. This recess 89 is closed at the top by means of a rubber diaphragm or membrane 90. This membrane 90 is provided with four pins or plugs 91 at the upper face, these pins 91 engaging with recess 92 at the lower surface of the extended base or foot 80' of the clamping element 80.

The piston rods 75 and 76 secured at the lower guide portion 72 are each provided with a central bore 93. The bores 93 extend along the associated piston rod up to the end surface of the associated pneumatic piston 78 (FIG. 2). At the inner end of the piston rod 75, within the guide portion 72, the piston rod bores 93 are connected via channels 94 to a control valve 95. A channel 96 flow communicates or connects the control valve 95 with the compartment or recess 89 beneath the membrane or diaphragm 90. A valve piston 97 which is freely or loosely movable to-and-fro within the valve 95 opens in its outer end or terminal position, which is illustrated in FIG. 2, the connection to the channel 96 and flow communicates the channel 94 with the channel 96. In its inner terminal or end position the valve piston 97 closes the channel 96 and opens a channel 98 and a venting channel 99.

In the position of the clamping mechanism C depicted in FIGS. 2 and 9, the piston means 77 of the piston rods 75 and 76 is impinged at the left side or face and is displaced towards the right. At the same time pressurized air arrives through the agency of the piston channels 93 at the valve 95 and through the channel 96 into the space or compartment 89 beneath the membrane 90. This membrane or diaphragm 90 is upwardly pressed and by means of the pins 91 the movable clamping shoe arrangement 80, 80' is pressed upwardly against the fixed clamping element or portion 70, so that the support bands 15 are fixedly clamped at the recesses 81 between both clamping elements 70 and 80, and entrained by the clamping mechanism displaced from the left towards the right. As a result, a fresh support band length is paid-off the supply rolls 23 and placed into the lower mold half 10.

The valve piston 97 possesses a piston pin 100 which protrudes past the side wall of the guide portion 72 and an impact or stop plate 101 (FIG. 14) and at the end of the stroke of the clamping mechanism C impacts against a stop 102 which is adjustably secured through the agency of a micrometer screw 103 at the support member 59. When the pin 100 bears against the stop 102, then, the valve piston 97 is displaced towards the left and closes the compressed air delivery channel 96 to the hollow compartment 89 beneath the membrane 90, whereas it simultaneously opens the venting channels 98 and 99, so that the hollow compartment 89 is vented. The movable clamping element 80 is downwardly displaced by spring 104 (FIG. 9) and the clamping tong or gripper arrangement formed by the components 70 and 80 open and releases both support or carrier bands 15.

At the same time as the piston pin 100 of the valve 95 impacts against the stop 102, an actuation pin 105 of terminal or end switch 64 (FIG. 1 and 14), owing to contact of the edge 106 against a contact roll 107 at the pin 105, is inwardly displaced and switches the terminal switch 64 which controls the delivery of compressed or pressurized air to the piston cylinders 77 (FIG. 2). The delivery of compressed air to the left face of the piston 78 is shut-off and compressed air is delivered via the cylinders 77 to the right face of the pistons or piston means 78, so that such will be displaced towards the left and by means of the piston rods 75 and 76 the clamping mechanism C is displaced out of its right-hand terminal position towards the left. Since the clamping tong components are no longer pressed together, the support bands 15 are not entrained during this rearward movement of the clamping mechanism, rather remain fixedly retained in their advanced position, as will be described more fully hereinafter. At the end of the return movement of the clamping mechanism C the latter impinges by means of its fixed stop 108 against a pin 109 which is movable relative to and extends out of the housing 69, this pin 109 being displaced inwards and as soon as the stop 108 impinges against the end wall of the housing 69, activates a non-visible terminal switch responsible for shutting-off the delivery of compressed air to the cylinders 77 at the right side of the pistons 78 and again impinges the left face or side of the pistons with the pressurized or compressed fluid medium e.g. air. The pressure again becomes effective at the hollow compartment 89 of the clamping mechanism C and the movable clamping tong element or portion 80 fixedly clamps the support bands 15 against the clamping tong element or portion 70. At the same time the mold is opened through the agency of the action of a standard programming cylinder or roller 200, schematically partially shown in FIG. 1, which controls the injection molding unit 6, and the injection molded part is ejected by the ejector pins 51 out of the hollow mold compartments of the lower mold half 10 into the position of FIGS. 2 and 3. The pistons 78 impinged at their left faces are displaced towards the right, and the injection molded part injection molded at the mold 9, 10 is pulled by means of the clamping tong or gripper portions 70, 80 out of the mold 9, 10 and through the guide mechanism B, whereas the fresh support band length 15 is drawn into the mold. As soon as the clamping mechanism C, which moves towards the right, impinges by means of the switching pin 100 against the stop 102, then, as already described, the clamping tong portions 70, 80 are released and the prior fluid impingement of the pistons 78 is switched-over, so that the clamping mechanism C is again guided back towards the left against the guide mechanism B without entraining the support or carrier bands, as will again be discussed more fully hereinafter.

In this manner, the clamping mechanism C continuously reciprocates or moves back and forth between the stop 102 of the support element 59 and the end wall of the fixed housing 69. The stroke of the clamping mechanism C between both such terminal or end positions can be varied and adjusted in accordance with the length of the mold 9, 10 and the length of the sliding fastener which is to be fabricated. A coarse adjustment of this length takes place by displacing and fixing the support bracket 58 at the support columns 57 and a fine adjustment of such stroke is attained by adjusting the micrometer screw 103 carrying the stop 102.

The previously mentioned cutting mechanism D has been illustrated in FIG. 11. It serves for the continuous separation of the sprue ledge 14' with the material projections or shoulders 56' which have solidified at the individual transverse channels 56 from both rows of closure elements 13 which have been injection molded at the support or carrier bands 15. At the angle member 62, which is fixedly seated for transverse adjustment at the support element or piece 59, there is secured a block 110 having a semi-circular shaped recess 111. In this recess 111 there is loosely rotatably mounted at a shaft 112 a cutter body member 114 carrying two circular cutting elements or blades 113. At the upper surface of this cutter body member 114 there are threadably connected two ledge members 115 and 116 which leave free therebetween a throughpassage 117 for the sprue cone 49 which has solidified at the sprue channel 12 of the mold half 9. At the upper surface of the block 110 and at the lower surfaces of both ledges 115 and 116, there are provided oppositely situated recesses 118 and 119 which collectively form a respective hollow space or compartment for the throughpassage of the closure elements molded at the support band beads or margins. At both sides of such hollow compartments the lower surfaces of both ledges 115 and 116 and the upper surface of the block 110 are constructed in such a manner that a small opening 120 is provided for the through-passage of the support bands 15. The cutting edges of the circular-shaped cutting blades 113 extend somewhat over the height of the small sprues or spurs 56' solidified in the transverse channels 56 of the mold 9, 10. During feed of both support bands 15 with the injection molded parts solidified thereon, and as will be described more fully hereinafter, these support bands 15 are drawn through the cutting mechanism D, and the cutting disks or blades 113 separate the sprues 56' along the head of the closure elements 13 from the latter, so that the sprue ledge 14' solidified at the distributor channel 14 with the sprues or spurs 56' can be again collected as further usable material waste, whereas the support bands with the thereon injection molded closure elements 13 can be wound, for instance, upon suitable take-up rolls.

Figure 12:
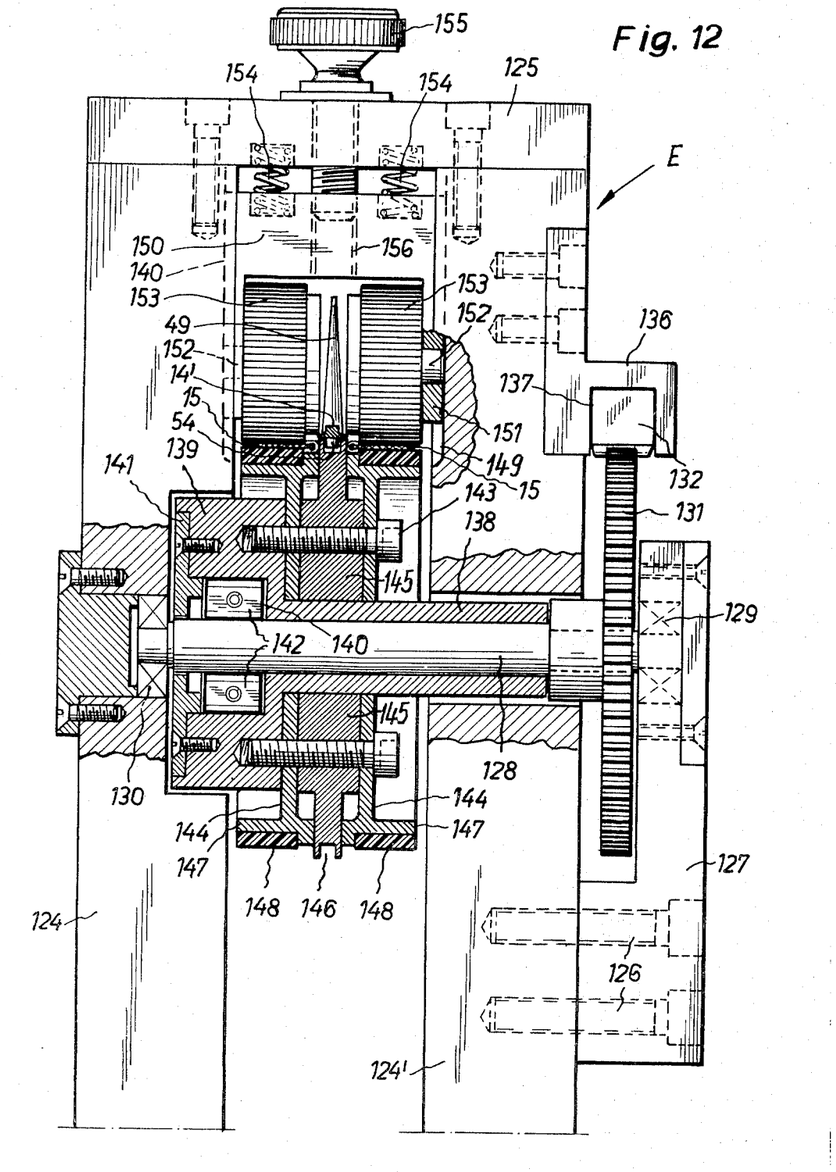
FIG. 12 is a view of the machine looking in the direction of the arrow $a$ of FIG. 2 and shows a portion of the band feed mechanism, partially in section.

The return blocking device or return movement suppressor E associated with the feed mechanism has been depicted in FIG. 12. Now at both support columns 57 (FIG. 1) there is welded a support frame 122 to two displaceable and fixedly adjustable hollow sleeves or bushings 121. This support frame 122 has a base or foot portion 123 and two support columns 124, 124' (FIG. 12) which are interconnected at the top by means of a transverse member 125. At the support column 124' there is secured by means of screws 126 or equivalent structure, a support or mounting bearing 127. This bearing 127 carries through the agency of ball bearings 129 one end of a shaft 128, the other end of which is mounted by ball bearings 130 in the other support column 124. Keyed to one end of the shaft 128 is a gear 131 which is in meshing engagement with a rack 132. The inner end of this rack 132 is secured to an angle member 133 (FIG. 2) which is threadably connected to the fixed clamping tong or gripper element 70 of the clamping mechanism C. The upper horizontal leg 134 of this angle piece 133 possesses a groove 135, as best seen by referring to FIG. 1, into which there can be inserted the end of the gear rack 132 and then threadably connected with such leg 134. Laterally of the support column 124' above the gear 131, there is attached a guide piece 136 exhibiting a groove 137 through which there is guided the rack 132 at the point of meshing engagement with the gear 131 and is retained in continuous meshing relationship therewith.

A sleeve or bushing 138 is loosely rotatably mounted at the gear shaft 128. This sleeve 138 carries at one end a flange ring 139 of larger diameter. The inner surface of the ring 139 bounds together with the surface of the shaft 128 a hollow compartment 140 which is closed towards the outside by means of a threadably connected cover member 141. Clamping elements or pieces 142 are arranged in known manner in the hollow compartment 140, so that the surface of the shaft 128 forms an inner clamping track and the inner surface of the ring 139 the outer clamping track of a clamping element-free wheeling arrangement. If the shaft 128 driven by the rack 132 through the agency of the gear 131 rotates in the direction of the arrow r' (FIG. 15), then, the clamping elements or pieces 142 are fixedly clamped between the shaft 128 and the ring member 139 which is loosely mounted thereon and this ring member 139 is entrained by the shaft. On the other hand, if the shaft 128 rotates in a direction opposite to the direction of the arrow r', then the clamping pieces 142 are released and there does not occur any entrainment of the ring member 139 by the shaft 128.

Now secured by means of screws 143 to the ring member 139 seated loosely upon the shaft 128 are two wheel disks 144 at a spacing from one another and a wheel body member 145 disposed between these wheel disks 144. The wheel body member 145 is provided with a peripheral groove 146 and rigidly connected for rotation with the ring member 139. Both wheel disks 144 possess a respective wheel rim or crown portion 147 provided with a friction coating 148 formed of rubber for instance.

At the upper portion of both support columns 124 at their oppositely situated inner faces or sides such are provided with a respective vertical guide groove 149 for a substantially U-shaped sliding member 150. At both legs 151 of the sliding member 150 there are rotatably mounted at pins 152 located at the same alignment two friction wheels 153 having a serrated or grooved periphery. Between the transverse member 125 and the sliding member 150 there are arranged two helical springs 154 which serve to downwardly press the sliding member 150 together with both friction wheels 153 against the wheel disks 144. A regulating screw 155 is supported by means of its head portion at the transverse member or piece 125, penetrates by means of its shaft through such transverse piece and is threadably connected in a threaded bore 156 of the sliding member 150, as best shown by referring to FIG. 12.

The support bands 15 separated at the cutting mechanism D from the central sprue ledge 14' and the lateral sprues 56' with the thereon molded closure elements 13 are guided between and through the rubber coating or lining 148 of the wheel disks 144 and the serrated periphery of the friction wheels 153. The mutual axial spacing between both wheel disks 144 and both friction wheels 153 is chosen such that both sliding fastener bands 15 with the closure elements and the separated central sprue ledge 14' are guided between the wheels 153 and the friction coatings 148 in the same position as they depart from the cutting mechanism. The central sprue ledge 14' is supported upon the edges of the peripheral groove 146 of the wheel body member 145, the material plugs 54 of the sprue ledge slide through the groove 146 and the sprue slug or cone 49 moves through the intermediate space between both friction wheels 153. After the sprue ledge 14' has passed between the friction wheels 153 and the central wheel body member 145, it is removed as waste material.

The support or carrier bands 15 passing between the friction wheels 153 and the rubber coatings 148 of the wheel disks 144 are lightly fixedly clamped by the pressure of the springs 154 exerted against the sliding member or piece 150 which presses the wheels 153 against the rubber coating 148. When the rack 132 moves with the clamping mechanism C in the direction of the arrow r of FIG. 2, then, the gear 131 and the shaft 128 rotate in the direction of the arrow r' of FIG. 15. The clamping pieces 142 are fixedly clamped between the shaft 128 and the ring member 139 and transmit the rotational movement of this shaft to such ring member with which there are fixedly threadably connected the wheel disks 144 and the wheel body member 145. The latter components rotate together with the shaft 128 and owing to friction between the coatings 149, the support bands 15 and the friction wheels 153, the friction wheels 153 are likewise placed into rotation and both support bands 15 are forwardly moved between the coatings 148 and the friction wheels 153, together with the continuous sprue ledge 14' until the clamping mechanism C abuts in the aforedescribed manner against the stop 102. Since the gear rack 132 is secured to the clamping mechanism C, and since the gear 131 meshing with the rack 132 possesses the same diameter as both wheel disks 144 with the coatings 148, both of the support bands 15 are forwardly drawn by means of the cooperating wheels 153 and 144 with the same speed as the speed with which the clamping mechanism C forwardly draws the support bands 15 with the thereon injection mold closure elements out of the mold 9, 10. Thus, between the clamping mechanism C and the return blocking device or return movement suppressor E, the support bands 15 remain in a taut or stretched condition.

As soon as the clamping mechanism C at the end of its forward stroke has reached the stop 102 and the clamping tong or gripper portions 70, 80 are opened and release the support bands, the gear 131 together with the shaft 128 is brought to standstill. The clamping mechanism C is immediately rearwardly moved by the pneumatically driven pistons 78 and entrains therewith the gear rack 132 secured thereto. The opened clamping tong portions 70, 80 slide over the stationary support bands 15 which are fixedly clamped by the pressure of the springs 154 (FIG. 12) between the wheels 153 and the friction coatings 148, whereas the shaft 128 which now rotates opposite to the direction of the arrow r' (FIGS. 2 and 15) can free-wheel or freely run, so that the flange ring member 139 with the thereon threadably connected wheel bodies 144 and 145 remain stationary. By means of the regulating or adjusting screw 155, (FIG. 12), it is possible to adjust the pressure by means of which the friction wheels 153 press both support bands 15 against the friction coatings or linings 148, in order that both such support bands during the forward advancing movement of the gear rack 132 are drawn forwardly in a proper manner and during the return movement of the gear rack 132 are fixedly retained against any unintentional rearward sliding movement.

The main motor 157 of the machine is arranged at the machine housing or frame 1, whereas the pressurized oil required for operating the injection molding unit 6 is delivered by an oil pump and the compressed air required for operating the feed mechanism is delivered by a compressor, both of which components may be of standard design and which oil pump and compressor are advantageously mounted internally of the housing, and have not therefore been particularly shown.

In order to explain the mode of operation of the described injection molding machine, the discussion will proceed from the operating condition depicted in FIG. 1. The main or primary motor 157 is in operation, oil pressure for operating the injection molding unit 6 and compressed air for operating the feed mechanism are available. The support bands 15 are drawn over the lower mold half 10 and through the guide B, the band clamping mechanism C, the cutting mechanism D, and the return movement-blocking mechanism, as generally indicated by reference character E.

The completely automatic operation of the described equipment is controlled by a command device or console 158 arranged laterally of the machine through the agency of the programming cylinder or roller 200 driven by the main motor 157 and which is arranged beneath the fixed machine plate member 2. The movable machine plate member 4 with the raised upper mold half 9 is located in its upper terminal position. During rotation of the programming cylinder the plate member 4 with the injection molding unit 6 and the upper mold half 9 are downwardly moved via the piston rods 3 through the agency of the non-illustrated pressurized oil cylinder for the purpose of closing the mold unit 9, 10. At the movable mold plate member 4 there is attached a time-delay switch 159, the movable spring-biased switching element 160 of which slides along a fixed cam or curved rod 161 attached to the housing or frame 1. If the plate member 4, as illustrated in FIG. 1, is located at the upper end of its stoke, then the switching element 160 is retained by the head portion 161' of the rod 161 in its switched-out position, and as soon as the plate member 4 travels downwardly for purposes of closing the mold, then, the switching element 160 is released by the head portion 161' and the switch is activated, but however will first become effective after about three seconds for carrying out a switching operation.

During the mold closure movement for the injection unit, the screw or worm motor 7 is at standstill. Now at the movable machine plate member 4 there is secured a vertical rod 162, at the lower portion which penetrates into the interior of the housing or frame 1, there are provided two adjustable switch actuating sleeves or collars 163 and 164. The switch collar 163 cooperates with a switch 165, the actuation pin 166 of which drops-off the collar upon descending of the rod 162 and therefore delivers to the command device 158 a signal which brings about retraction of the ejector pins 51 at the lower mold half 10 by means of oil pressure, so as to assume the position depicted in phantom lines in FIGS. 2 and 13.

When the mold or mold unit 9, 10 is closed, then the rod 162 abuts with its lower end against a terminal switch 167 and at the same time the switching collar 164 travels onto an actuation pin 168 of a switch 169. Actuation of the terminal switch 167 generates a signal which indicates to the command device that the mold 9, 10 is now closed. The programming cylinder 200 then rotates further and controls injection of the plasticized material into the mold, which takes place by the feed of pressurized oil through the line 170 (FIG. 1) to the screw or worm piston, so that the injection molding unit 6 with the motor 7 rapidly moves downwards relative to the closed mold 9, 10 and the plasticized material is injected into such mold. The programming cylinder or roller likewise controls the opening and closing of the injection nozzle by means of the delivery of pressurized air through the conduit 171. As soon as injection of the material has taken place, then the nozzle is again closed, whereas at the same time owing to actuation of the switch 169 the worm motor 7 is placed into operation. The plastic granulate employed as the working material emanating from the filling funnel 21 is pressed downwardly through the worm cylinder, equipped with the heating mechanism 172, and plasticized. Owing to the material collecting at the injection end of the screw or worm, there is formed a dam-up pressure or pressure head at the lower end of the worm cylinder, by means of which the injection molding unit 6 is again upwardly displaced relative to the closed mold.

Now at the plate member 18 there is secured a switch 173 which controls the motor 7, the actuation element 174 of which cooperates with a rod 175 which is mounted so as to be lengthwise adjustable at the housing of the motor 7. The switch 173 is connected in series with the switch 169 at the machine frame or housing. When the injection molding unit 6 for the injection of the material is displaced downwardly relative to the plate member 18, and specifically through a distance between the transmission 8 and the yoke plate 18, then the switch 173 is closed by the rod 175. However, the current circuit of the motor at the switch 169 still remains open until the mold is closed and the switching collar 164 closes this switch 169. Thereafter, the motor 7 begins to rotate, and, as just described, the injection unit moves upwardly owing to the pressure head below the screw or worm. As soon as the rod 175 has again released the actuation element 174, then the current circuit of the motor 7 is interrupted, the screw or worm stands still, and the dosing of plastic granulate is terminated. Due to lengthwise displacement of the rod 175, it is possible to alter the point of time of switching-out of the switch 173, so that the motor 7 can remain switched-in during a shorter or longer period of time, and therefore, the dosed quantity conveyed by the worm can be chosen to be smaller or greater.

In the meantime, the time-delay switch 159 has become effective after the expiration of about three seconds and opens a compressed air valve by means of which the compressed air cylinder becomes impinged with compressed air at the right side of the pistons 78 (FIG. 2). The clamping mechanism C at this period of time is located at the end of its feed stroke and therefore bears against the stop 102 (FIG. 2). The piston pin 100 has vented the membrane 90 (FIG. 9), the spring 104 displaces the movable clamping tong portion 80 downwards and the clamping tong or gripper portions 70, 80 release the support or carrier bands 15. The pneumatic pistons 78 travel towards the left of FIG. 2 and entrains by means of the piston rods 75 the opened clamping mechanism C. The rack 132 is displaced by the clamping mechanism C in the direction of the arrow $a$ of FIG. 2 and the gear 131 and the shaft 128 rotate in the direction of the arrow $a'$, i.e. opposite to the aforediscussed rotational direction $r'$. As already described, during this rotational movement of the shaft 128 the clamping pieces 142 are released. The sleeve 138 of the flange ring member 139 remains stationary. This is also the case for the wheel disks 144 with the friction coatings 148 which are threadably connected with the flange ring member and as a result both of the friction wheels 153 are not driven. These friction wheels 153 are pressed against the support bands 15 owing to the action of the springs 154 acting upon the slide member 150 and thus hold the support bands 15, during the return movement of the clamping mechanism C, fixedly at their location, so that the opened clamping tong portions 70, 80 can slide back over the stationary support bands 15.

During such time as the clamping mechanism C slides back with the support bands stationary and until it arrives by means of the stops 108 against the fixed housing 69, the mold unit 9, 10 with the therein injection molded slide fastener remains in its closed condition. By means of one of the stops 108, the movable pin 109 is inwardly displaced and has actuated the previously discussed non-illustrated terminal switch which switches the control valve for the infeed of compressed air to the pneumatic cylinder means 77 in order to interrupt the delivery of compressed air to the right face or side of the piston means 78 and to impinge the left side of the piston means, whereby, as already described, compressed air arrives via the channel 93 into the hollow compartment 89 below the movable clamping tong portion 80 (FIG. 9) and both support or carrier bands 15 are again fixedly clamped between the tong or gripper portions 70 and 80.

In the meantime, the programming cylinder or roll of the injection unit is rotated further and brings about opening of the mold by raising the upper mold half 9 into the position of FIGS. 1, 9 and 10. At the same time, the ejector pins 51 at the lower mold half 10 are raised until their upper ends are flush with the parting plane of the mold. The molded closure elements 13 are now raised out of the associated hollow mold compartments 55 and the mold material plugs 54 out of the openings 50 of the ejector pins. The sliding surfaces for the support or carrier bands 15 at the band braking mechanism A and the band guide mechanism B at the respective rear and front end of the mold 9, 10 are situated somewhat higher than the parting or separation plane of the mold, so that with the raised upper mold half and extended or stretched support bands, the material plugs 54 are located somewhat above the mold parting plane and the injection molded part can be pulled-out of the mold without obstruction, as same is apparent from the showing of FIGS. 2 and 3. Owing to the piston 78 impinged at its left face, the clamping mechanism C is now again moved towards the right towards the columns or strands 58, and since the clamping tongs 70 and 80 are closed, the injection molded part molded at the support bands 15 and raised from the lower mold half 10 is pulled together with the bands 15 through the guide mechanism B. Owing to the clamping mechanism C which now travels towards the right, the rack 132 is also moved in the direction of the arrow r, the gear 131 and the shaft 128 rotate in the direction of the arrow r', in which direction of rotation, as previously described, the clamping pieces 142 fixedly clamp the free-wheeling drive and the sleeve 138 with the flange ring member 139 and the therewith threadably connected wheel disks 144 are placed into rotation in the same direction. The support bands 15 are pressed by means of the spring-loaded friction wheels 153 against the friction coatings 148 of both rotating wheel disks 144 and these friction wheels are likewise placed into rotation and exert, together with the wheel disks, a traction force upon the support bands 15. As a result, the support bands 15 together with the injection molded parts, cast in the earlier injection molding operation, are drawn through the cutting mechanism D and the sprue ledge 14' with the lateral sprues 56' are separated from both molded closure element rows along the cutting lines b (FIG. 4). After passage through the cooperating friction wheels 153 and wheel disks 144, both of the support bands with the thereon molded or cast closure elements can be conveniently wound for instance upon suitable take-up rolls. The part of the sprue ledge 14' which has been cut-off the support bands together with the sprue spur or cone 49 travels between and through both of the friction wheels 153 and can be broken off from time to time at the output end of the machine and collected for re-use as molding material.

As soon as the pin 100 of the clamping mechanism C impacts against the adjustable stop 102 at the support piece or element 59, it actuates the valve 95 which vents the pressure compartment 89 beneath the movable clamping tong or gripper element 80; the tongs or grippers 70, 80 release the support bands 15, but such are fixedly retained by the clamping pressure prevailing between the friction wheels 153 and the wheel disks 144 of the free-wheeling drive. At the same time as the pin 100 of the clamping mechanism C impacts against the stop 102, the edge 106 of the component 73 of the clamping mechanism C has travelled onto the roller 107 and displaced the actuation pin 107 of the terminal switch 64 which brings about reversal of the infeed of the compressed air to the pneumatic cylinder 77, so that piston 78 will be again impinged at the right face thereof. All components of the equipment are now again located in the starting position of FIG. 1 and a new injection molding operation can begin.

With the exemplary explained mode of operation of the described injection molding machine, there are produced sliding fasteners, typically zippers, the length of which approximately corresponds to the length of the bipartite mold unit 9, 10. As best seen by referring to FIG. 4, there is always present a spacing e between the closure element rows molded at the support bands 15 during two successive injection molding operation. For completing the fabrication of the zippers the bands are cut at these locations and the two associated individual bands are inserted into a conventional zipper slide, whereupon the slide fastener or zipper is ready to be sold. It is unnecessary to carry out any post-manufacturing work or smoothing of the separation locations of the closure slide heads from the sprues 56' since the cutting mechanism D brings about a clean cutting or separation of the closure elements.

Now it is possible by means of the described machine to likewise fabricate sliding fasteners of greater length than the length of the mold. For this purpose, there is provided at the end of the lower mold half 10 (FIG. 3) a slightly conical recess 180. The stroke length of the band feed of the material is now adjusted by means of the coarse adjustment of the support bracket 58 along the guide columns 57 and by means of the fine adjustment of the stop 102 by means of the micrometer screw 103 in such a manner that at the end of the forward stroke of the clamping mechanism C, in other words during its arrival at the stop 102, the injection molded part molded at the mold has not been completely drawn-out of the mold, rather the last material plug 54 is located at the pouring-in or sprue ledge 14' above the conical recess 180. This recess is arranged exactly with regard to the hollow mold compartments 55, 55' in such a manner that upon closing the mold the last plug 54 of the sprue ledge 14' engages with the recess 180 and at the same time the last two or three closure elements 13 of both rows of closure elements molded at the bands 15 are pressed into the last hollow spaces or cavities 55 and 55' of the closing mold. During the next following molding operation, there is thus subsequently molded a further partial piece at a partial piece of a closure element row which is already molded at the support bands, the first closure element of which possesses the correct spacing from the last closure element of the previously molded closure element row appearing at the support bands. In this way, it is possible to produce sliding fasteners, the length of which is a multiple of the length of the casting mold of the machine.

While there is shown and described present preferred embodiments of the invention, it is to be distinctly understood that the invention is not limited thereto but may be otherwise variously embodied and practiced within the scope of the following claims.

I claim:

1. An injection molding machine for fabricating sliding fasteners, especially zippers, by injecting molding closure elements onto support bands in a bipartite mold, comprising: a bipartite mold, means for opening and closing said mold, an injection molding unit for injection molding material into said mold, a band feed mechanism for feeding support bands through said mold, said band feed mechanism comprising a to-and-fro movable band clamping mechanism provided with clamping elements and arranged in the band feed direction after the mold, pneumatically actuated means for displacing said to-and-fro movable band clamping mechanism, means for selectively opening and closing said clamping elements, stop means cooperating with said band clamping mechanism; said band clamping mechanism being synchronously controlled with the opening and closing movement of the mold in such a manner that when the mold is open the clamping elements fixedly clamp the support bands at the region of the mold, the clamping mechanism is then advanced in the feed direction until reaching said stop means in order to draw the support bands with the closure elements molded thereon out of the mold and to draw a new length of band into the open mold, upon impact of said clamping mechanism against said stop means the clamping elements release the support bands, and then the clamping mechanism is again retracted towards the mold and in its terminal position upon closing of the mold the clamping elements again fixedly clamp the support bands; said clamping elements comprising a relatively stationary clamping element and a clamping element movable with respect to the stationary clamping element and cooperating therewith, the support bands being guided between and through both clamping elements, said displacing means comprising guide rod means along which move said clamping mechanism, piston rod means for connecting said clamping mechanism with pneumatically actuated piston means for moving said clamping mechanism to-and-fro between said stop means and the mold; said movable clamping element being provided with a pressure compartment closed by a diaphragm, means for supplying compressed air to said pressure compartment, slide valve piston means for controlling connection of said pressure compartment with said compressed air supplying means, and venting channel means; so that when the clamping mechanism has reached the end of its stroke at the region of the mold and said piston means is impinged in order to displace the clamping mechanism in the feed direction against the other end of the stroke, said slide valve piston means opens connection of the compressed air supplying means to said pressure compartment in order to press the diaphragm against the movable clamping element and to displace said movable clamping element against the fixed clamping element for the purpose of fixedly clamping the support bands, whereas at the other end of the stroke of the clamping mechanism, said slide valve piston means impinges against said stop means and the pressure compartment is connected with said venting channel means to release the support bands.

2. An injection molding machine for fabricating sliding fasteners, especially zippers, by injecting molding closure elements onto support bands in a bipartite mold, comprising a bipartite mold, means for enabling opening and closing of the mold, an injection molding unit for injection molding material into said mold, a band feed mechanism for feeding support bands through said mold, said band feed mechanism comprising a to-and-fro movable band clamping mechanism provided with clamping elements and arranged in the band feed direction after the mold, means for displacing said to-and-fro movable band clamping mechanism, means for selectively opening and closing said clamping elements, stops means cooperating with said band clamping mechanism, said band clamping mechanism being synchronously controlled with the opening and closing movement of the mold in such a manner that when the mold is open the clamping elements fixedly clamp the support bands at the region of the mold, the clamping mechanism is then advanced in the feed direction until reaching said stop means in order to draw the support bands with the thereon molded closure elements out of the mold and to draw a new length of band into the open mold, upon impact of said clamping mechanism against said stop means the clamping elements release the support bands, and then the clamping mechanism is again retracted towards the mold and in its terminal position upon closing of the mold the clamping elements again fixedly clamp the support bands; drive means coupled with said clamping mechanism and including friction wheels, a rack movable to-and-fro with the clamping mechanism and secured to said clamping mechanism, a gear meshing with the rack, said drive means including clamping pieces, said gear having a shaft forming an inner clamping track for the clamping pieces, a flanged sleeve seated loosely upon the shaft and forming an outer clamping track for the clamping pieces, means for fixedly connecting the friction wheels with the flanged sleeve, said friction wheels being arranged coaxially with respect to the shaft and having the same diameter as the diameter of the pitch circle of the gear, a pair of friction wheel means loosely rotatably supported by a spring-loaded slide member, means for resiliently pressing said pair of friction wheel means against said friction wheels, said support bands being guided between the friction wheels driven during the advancing movement of the clamping mechanism and the loosely rotatably supported friction wheel means so that during the stroke of the clamping mechanism in the feed direction and with corresponding rotation of the gear by the rack, both clamping tracks of said drive means are coupled with one another, so that the friction wheels rotate with the shaft and the support bands are advanced, whereas during return movement of the clamping mechanism the shaft rotating in the opposite direction freely rotates and the support bands are fixedly retained by the friction wheels.

* * * * *